(12) United States Patent
Yabuki

(10) Patent No.: US 8,582,134 B2
(45) Date of Patent: Nov. 12, 2013

(54) INFORMATION PROCESSING APPARATUS AND PROGRAM THEREFOR

(75) Inventor: Tomoyasu Yabuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 981 days.

(21) Appl. No.: 12/358,103

(22) Filed: Jan. 22, 2009

(65) Prior Publication Data
US 2009/0185221 A1  Jul. 23, 2009

(30) Foreign Application Priority Data
Jan. 22, 2008  (JP) ................................. 2008-011613

(51) Int. Cl.
*G06K 15/10* (2006.01)

(52) U.S. Cl.
USPC .......... 358/1.14; 358/1.15; 358/1.2; 345/629; 345/667

(58) Field of Classification Search
USPC ................ 358/1.14, 1.15, 1.2, 442, 451, 474; 345/629, 667, 698, 699
See application file for complete search history.

(56) References Cited

U.S. PATENT DOCUMENTS

| | | | | |
|---|---|---|---|---|
| 5,610,688 A | * | 3/1997 | Inamoto et al. ............... | 399/366 |
| 5,966,114 A | * | 10/1999 | Ito et al. ......................... | 345/628 |
| 2003/0152231 A1 | * | 8/2003 | Tomita et al. ................. | 380/258 |
| 2004/0219902 A1 | * | 11/2004 | Lee et al. ....................... | 455/410 |
| 2006/0005045 A1 | | 1/2006 | Nakase | |
| 2006/0172779 A1 | * | 8/2006 | Yoshida ......................... | 455/567 |
| 2006/0176317 A1 | * | 8/2006 | Tamaki et al. ................ | 345/629 |
| 2006/0232811 A1 | * | 10/2006 | Yokoyama .................... | 358/1.14 |
| 2007/0229518 A1 | * | 10/2007 | Kii et al. ........................ | 345/520 |
| 2007/0296998 A1 | * | 12/2007 | Iwamoto et al. ............. | 358/1.14 |
| 2009/0089463 A1 | * | 4/2009 | Iga ................................. | 710/37 |

FOREIGN PATENT DOCUMENTS

| | | | | |
|---|---|---|---|---|
| JP | 2003288323 A | | 10/2003 | |
| JP | 2003308305 A | | 10/2003 | |
| JP | 2004274092 A | * | 9/2004 | |
| JP | 2006004289 A | | 1/2006 | |

* cited by examiner

*Primary Examiner* — Allen H Nguyen
(74) *Attorney, Agent, or Firm* — Baker Botts L.L.P.

(57) ABSTRACT

An information processing apparatus which has a processing function of processing information and includes a data providing device, a storage device, a setting device, a determination device, and a changing device. The data providing device provides data to the information processing apparatus, and the storage device stores data. The setting device is provided to selectively set a prohibited state and an allowed state of the processing function. The determination device determines whether or not provided data provided by the data providing device is identical with set data which is stored in the storage device as data to be used in a case of performing a processing function set by a user. The changing device instructs the setting device, when it is determined that the provided data is identical with the set data, to change one of the prohibited state and the allowed state previously set to the other state.

14 Claims, 11 Drawing Sheets

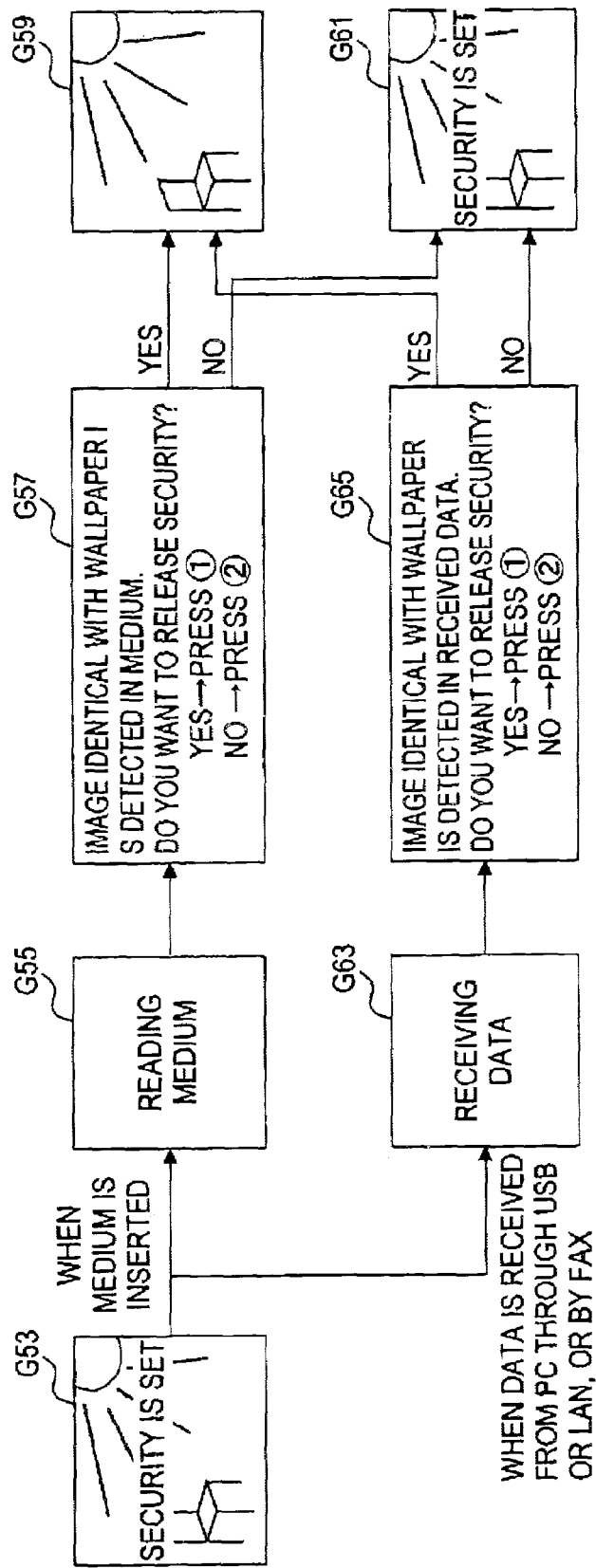

INFORMATION PROCESSING APPARATUS AND PROGRAM THEREFOR

CROSS-REFERENCE TO RELATED APPLICATIONS

This application claims the benefit of Japanese Patent Application No. 2008-11613 filed Jan. 22, 2008 in the Japan Patent Office, the disclosure of which is incorporated herein by reference.

BACKGROUND

This invention relates to an information processing apparatus and a program therefor.

In a conventional authentication system for an information processing apparatus, when a user inputs a password from a key switch, the password inputted by the user and a password previously stored in the authentication system are compared and use of the information processing apparatus is restricted depending on whether or not the two passwords are identical.

SUMMARY

According to the Conventional authentication system, the user who uses the information processing apparatus must remember the password since a determination of whether or not to restrict the use of the information processing apparatus is made based on the user's input of the password.

Accordingly, if the user forgets the password, the user cannot use the information processing apparatus and also needs to reset a password, which leads to a problem that troublesome operations are required.

It is, therefore, desirable to provide an information processing apparatus which may solve the problem.

One aspect of the present invention may provide an information processing apparatus having a processing function of processing information. The information processing apparatus includes a data providing device, a storage device, a setting device, a determination device, and a changing device.

The data providing device provides data to the information processing apparatus, and the storage device stores data. The setting device is provided to selectively set a prohibited state for prohibiting operation of the processing function and an allowed state for allowing the operation of the processing function. The determination device determines whether or not provided data provided by the data providing device is identical with set data which is stored in the storage device as data to be used in a case of performing a processing function set by a user. The changing device instructs the setting device, when it is determined by the determination device that the provided data is identical with the set data, to change one, of the prohibited state and the allowed state which is previously set to the other state.

According to the one aspect of the present invention, the user is not required to input a password and may change an operating state of the information processing apparatus from the prohibited state to the allowed state, or from the allowed state to the prohibited state easily by providing data identical with the set data to the information processing apparatus.

BRIEF DESCRIPTION OF THE DRAWINGS

The present invention will now be described below, by way of embodiments, with reference to the accompanying drawings, in which:

FIG. 12 is a flowchart schematically showing another operation of the multifunction device at the time of security release.

DETAILED DESCRIPTION OF THE PREFERRED EMBODIMENTS

In embodiments described below, an information processing apparatus of the present invention is applied to a multifunction device having a printer function and a facsimile function.

First Embodiment

1. Configuration of Multifunction Device

Figure 1:
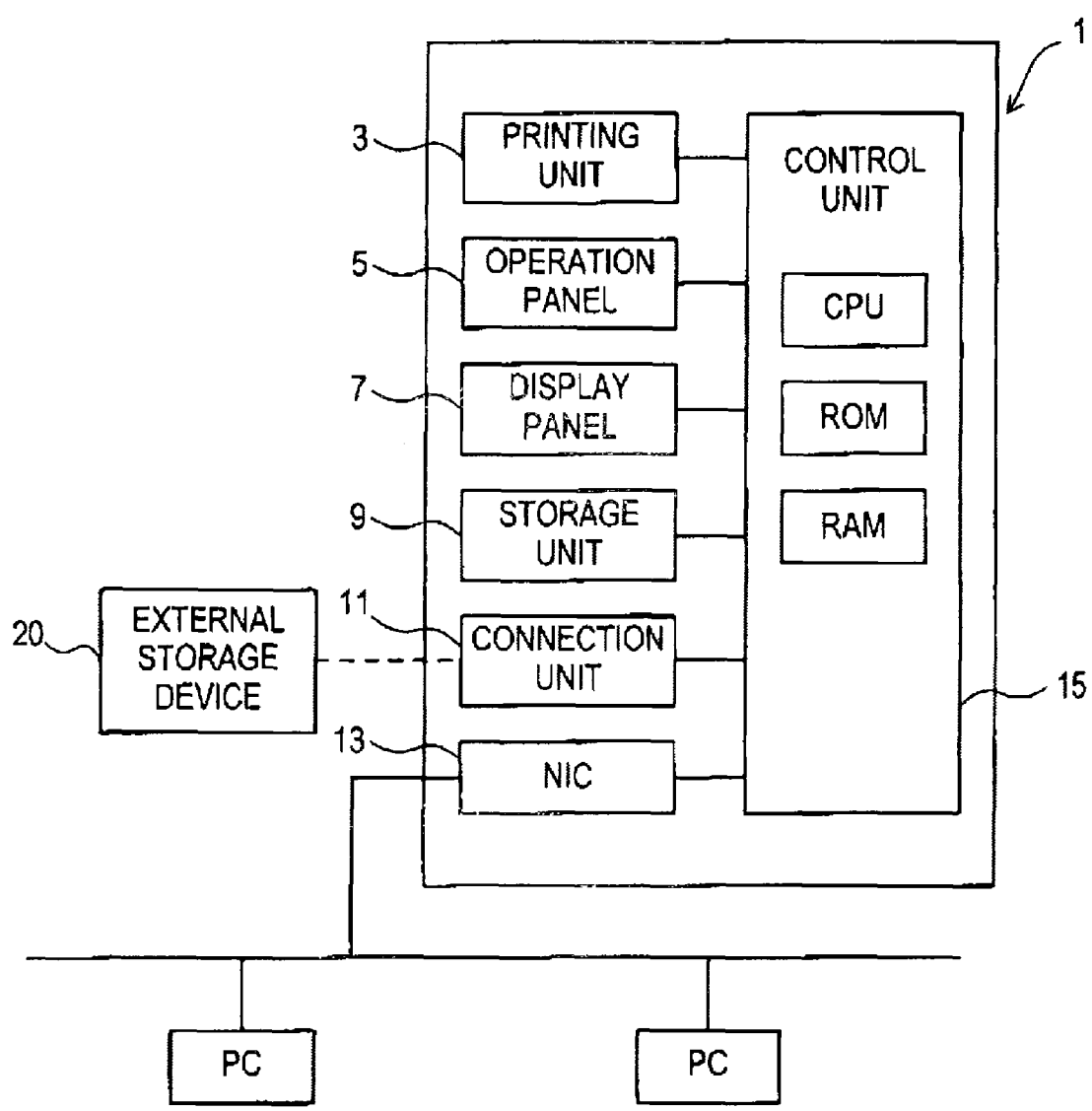
FIG. 1 is a block diagram showing a configuration of a multifunction device in the embodiments of the present invention.

As shown in FIG. 1, a multifunction device 1 includes a printing unit 3, an operation panel 5, a display panel 7, a storage unit 9, a connection unit 11, an interface for network connection such as an NIC (Network Interface Card) 13, and a control unit 15. The printing unit 3 forms an image on a recording medium such as recording paper. The operation panel 5 is operated by a user. The display panel 7 displays a variety of information. The storage unit 9 stores information (data). An external storage device 20 is attachably and detachably connected to the connection unit 11. The control unit 15 controls the printing unit 3, the display-panel 7, and others.

The control unit 15 is constituted by a known microcomputer which includes a CPU, a ROM, a RAM and others. Programs for executing processes shown in FIG. 5 through FIG. 8 are stored in the ROM.

Although the connection unit 11 in the present embodiment is a connection terminal (an interface) according to the USB (Universal Serial Bus) Protocol, the connection unit 11 is not limited to this, but may be a connection terminal according to another protocol. Also, the connection unit ii is capable of receiving facsimile data from an external communication device through public lines (not-shown) and the like.

Further, the external storage device 20 may be any type of storage device having an interface connectable to the connection unit 11. Specifically, the external storage device 20 may be a USB memory or an SD™ memory constituted by a non-volatile semiconductor storage device such as a: flash memory, a magnetic storage device such as an HDD, or a digital camera or the like compliant with PictBridge, which is a communication standard for directly connecting to the multifunction device 1 and performing printing.

The display panel 7 has a so-called touch panel function capable of detecting whether or not the user has touched the display panel 7 and a touched position. Accordingly, the user's operation may be received not only by the operation panel 5 but also by the display panel 7 in the present embodiment.

2. Characteristic Operation of Multifunction Device

2.1. Overview of Characteristic Operation

The multifunction device 1 of the present embodiment has the following characteristics. The multifunction device 1 is capable of selectively setting a prohibited state for prohibiting operation of various processing functions executable by the multifunction device 1 and an allowed state for allowing operation of the processing functions. The multifunction device 1 is also capable of changing from the prohibited state to the allowed state (hereinafter referred to as "security release") or changing from the allowed state to the prohibited state (hereinafter referred to as "security setting") associated with a background image (hereinafter referred to as a "wallpaper") displayed on the display panel 7.

2.2. Security Setting

The present embodiment provides two security setting methods, i.e., a first setting method and a second setting method. In the first setting method, security setting is performed when image data for a wallpaper is set, using the image data to be set for the wallpaper as key information for performing security release. In the second setting method, security setting is performed when image data for a wallpaper is already set, using the image data already set for the wallpaper as key information for performing security release.

2.2.1. First Setting Method

Figure 2:
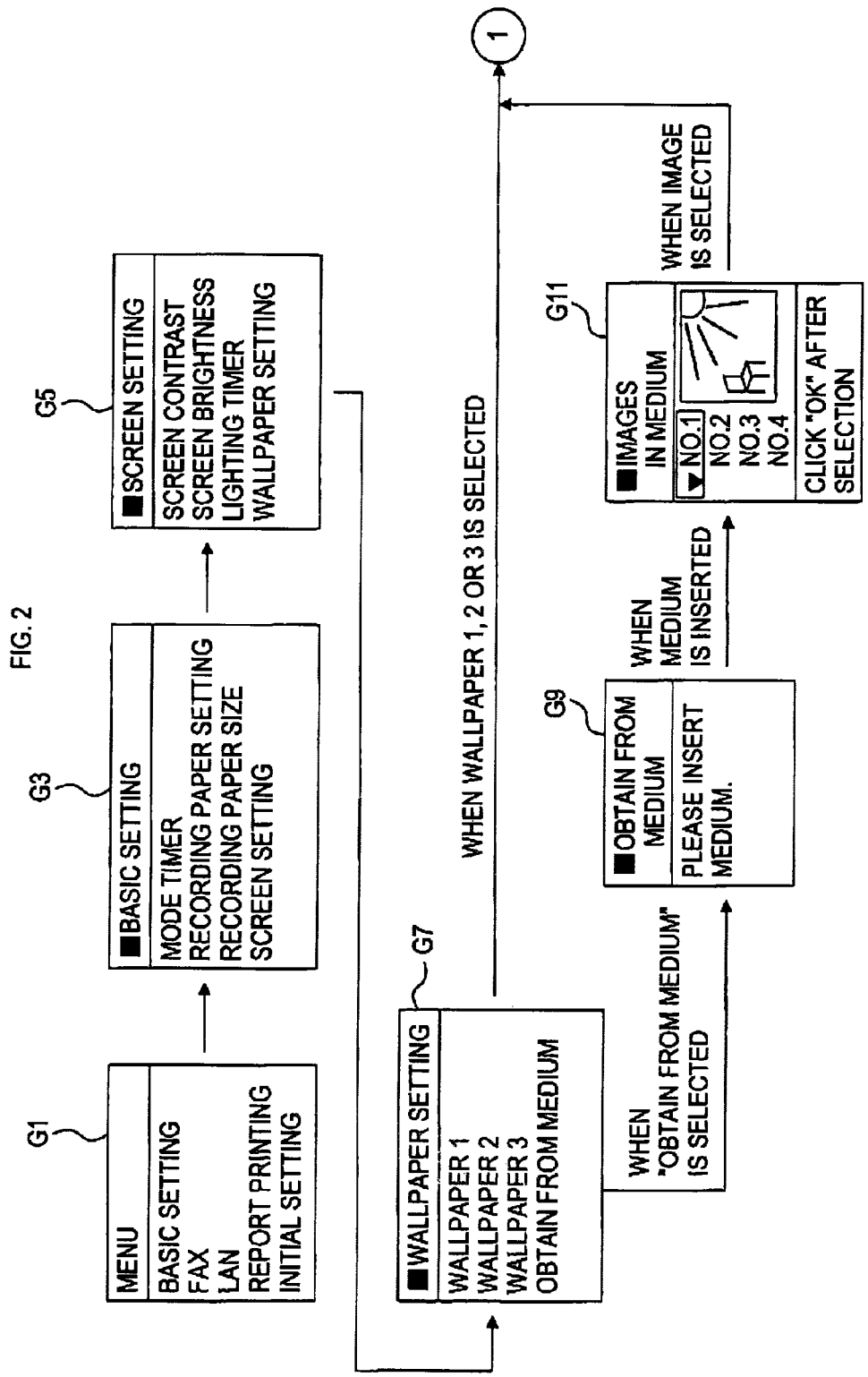
FIG. 2 is a flowchart schematically showing an operation of the multifunction device in line with a setting procedure according to a first setting method.
Figure 3:
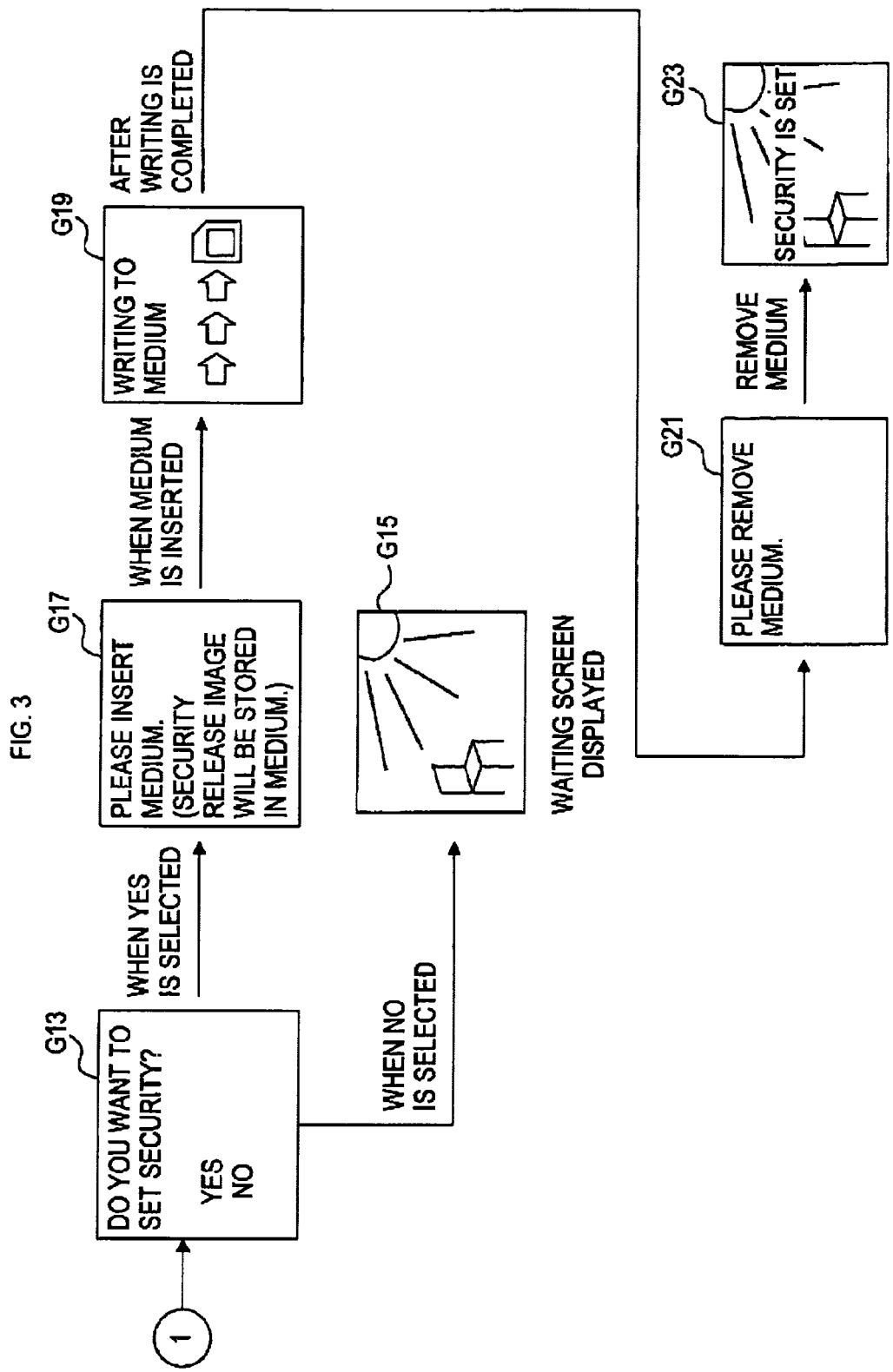
FIG. 3 is a flowchart schematically showing the operation of the multifunction device subsequent to FIG. 2 or FIG. 4.

FIG. 2 and FIG. 3 are flowcharts showing guidance screens displayed on the display panel 7 in line with a setting procedure according to the first setting method.

First, when the operation panel 6 is operated by the user, a menu screen G1 (see FIG. 2) for setting a process executable by the multifunction device 1 is displayed on the display panel 7. When "Basic Setting" in the menu screen G1 is selected by the user, a basic setting screen G3 is displayed on the display panel 7.

Subsequently, when "Screen Setting" in the basic setting screen G3 is selected by the user, a screen setting screen G5 is displayed on the display panel 7. Then, when "Wallpaper Setting" in the screen setting screen G5 is selected, a wallpaper setting screen G7 is displayed on the display panel 7.

"Wallpaper 1" to "Wallpaper 3" in the wallpaper setting screen G7 indicate that one of three types of wallpaper image data previously stored in the storage unit 9 of the multifunction device 1 is to be set for the wallpaper. "Obtain from Medium" in the wallpaper setting screen G7 indicates that image data stored in an attachable and detachable recording medium, such as the external storage device 20, connected to the connection unit 11 is to be set as wallpaper image data.

Here, "image data" means data including at least one of character (text) data and graphic data. Graphic data means data other than character data, such as photographic data, diagram data, chart data, etc., and stylized character data, or the like.

When one of "Wallpaper 1" to "Wallpaper 3" in the wallpaper setting screen G7 is selected by the user, a screen G13 (see FIG. 3) for urging the user to select whether or not to perform security setting using image data for the selected wallpaper as the key information to perform security release is displayed on the display panel 7.

When, on the other hand, "Obtain from Medium" in the wallpaper setting screen G7 is selected by the user, a message G9 (see FIG. 2) to insert the external storage device 20 (a medium) into the connection unit 11 is displayed on the display panel 7. When the external storage device 20 is inserted into the connection unit 11, image data stored in the external storage device 20 is read by the multifunction device 1, and file names (data names) and an overview of the image data G11 are displayed on the display panel 7.

When a piece of the image data in the overview G11 displayed on the display panel 7 is selected by the user, a screen G13 for urging the user to select whether or not to use the selected image data for the wallpaper as the key information to perform security release is displayed on the display panel 7.

When the user selects not to perform security setting ("No" in G13), the selected image data is displayed as the wallpaper on the display panel 7, and the display panel 7 enters a waiting state G15.

When the user selects to perform security setting ("Yes" in G13), a message G17 for urging the user to insert the external storage device 20 into the connection unit 11 is displayed on the display panel 7. When the external storage device 20 is inserted into the connection unit 11, the image data for the wallpaper, which has been set as the key information to perform security release, is written to the external storage device 20 inserted into the connection unit 11 and an image G19 indicating writing of the image data is displayed on the display panel 7.

When writing of the image data to the external storage device 20 is completed, a message G21 to urge removal of the external storage, device 20 from the connection unit 11 is displayed on the display panel 7, and then a screen G23 including the wallpaper and an indication that security setting has been performed is displayed on the display panel 7.

It may be possible to provide a storage area for the security setting data in the storage unit 9 and separately store the image data for the wallpaper set as the key information to perform security release in the storage area.

2.2.2. Second Setting Method

Figure 4:
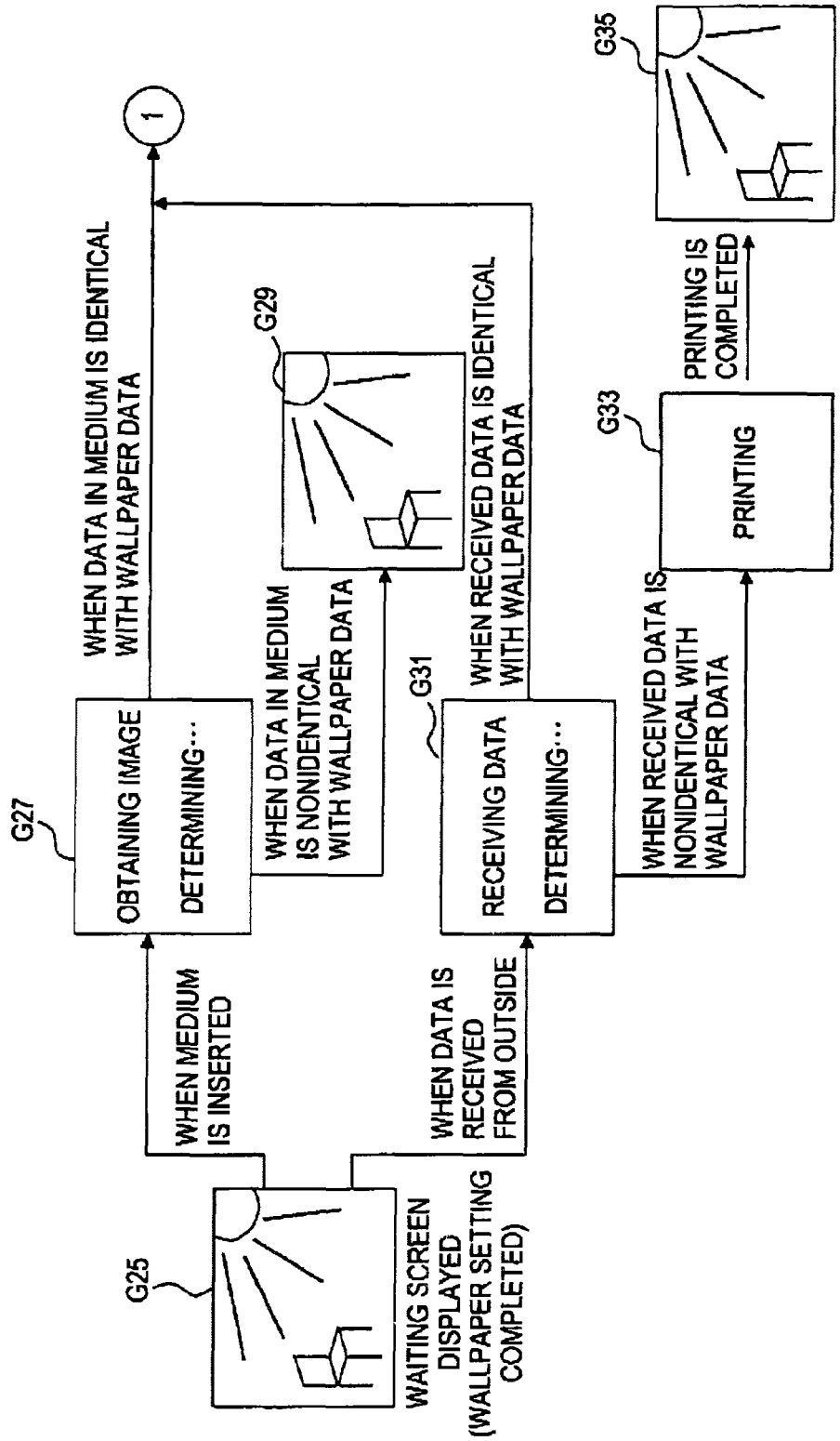
FIG. 4 is a flowchart schematically showing an operation of the multifunction device in line with a setting procedure according to a second setting method.

FIG. 4 and FIG. 3 are flowcharts showing guidance screens displayed on the display panel 7 in line with a setting procedure according to the second setting method. Since FIG. 3 is the same as in the first setting method and only a setting procedure before the screen G 13 is displayed is different from the first setting method, a description will be provided below only on a procedure shown in FIG. 4.

The second setting method is a setting method executable when security setting has not yet been performed and only image data for the wallpaper has already been set. Specifically, when security setting has not yet been performed and only image data for the wallpaper has already been set, image data G25 set for the wallpaper is displayed on the display panel 7.

When the external storage device 20 is inserted into (connected to) the connection unit 11 in this state, image data stored in the external storage device 20 becomes obtainable. Then, it is determined, according to the later-described method, whether or not image data identical with the image data currently set for the wallpaper is stored in the external storage device 20, and a screen G27 indicating that image data is being obtained and determination is being made is displayed on the display panel 7.

When it is determined that image data identical with the image data currently set for the wallpaper is stored in the external storage device 20, the screen G13 is displayed on the display 7, and then security setting may be performed according to the same procedure as in the first setting method.

On the contrary, when it is determined that image data identical with the image data currently set for the wallpaper is not stored in the external storage device 20, security setting is not performed and an initial screen (a waiting screen) G29 with the wallpaper is displayed on the display panel 7.

Also, when data transmitted from a computer (a PC in FIG. 1) is received as printing data, while the initial screen (the waiting screen) G25 is displayed on the display panel 7, it is determined, according to the later-described method, whether or not the image data currently set for the wallpaper (hereinafter referred to as "set data") and the received data are identical with each other. That is, it is determined, according to the later-described method, whether or not image data identical with the set data is included in the received data, and a screen G31 indicating that data is being received and determination is being made is displayed on the display panel 7.

When it is determined that the set data and the received data are identical with each other, the screen G13 is displayed on the display panel 7, and then security setting may be performed according to the same procedure as in the first setting method.

On the contrary, when it is determined that the set data and the received data are not identical with each other, security setting is not performed and the received data is regarded as data for printing. Then, a message indicating that printing is performed is displayed on the display panel 7. When printing of the received data is finished, an initial screen (a waiting screen) G35 with the wallpaper is displayed on the display panel 7.

2-3. Security Setting Process

FIG. 5 to FIG. 8 are flowcharts showing processes executed by the control unit (CPU) when the first setting method and the second setting method are performed.

2.3.1. Main Process

Figure 5:
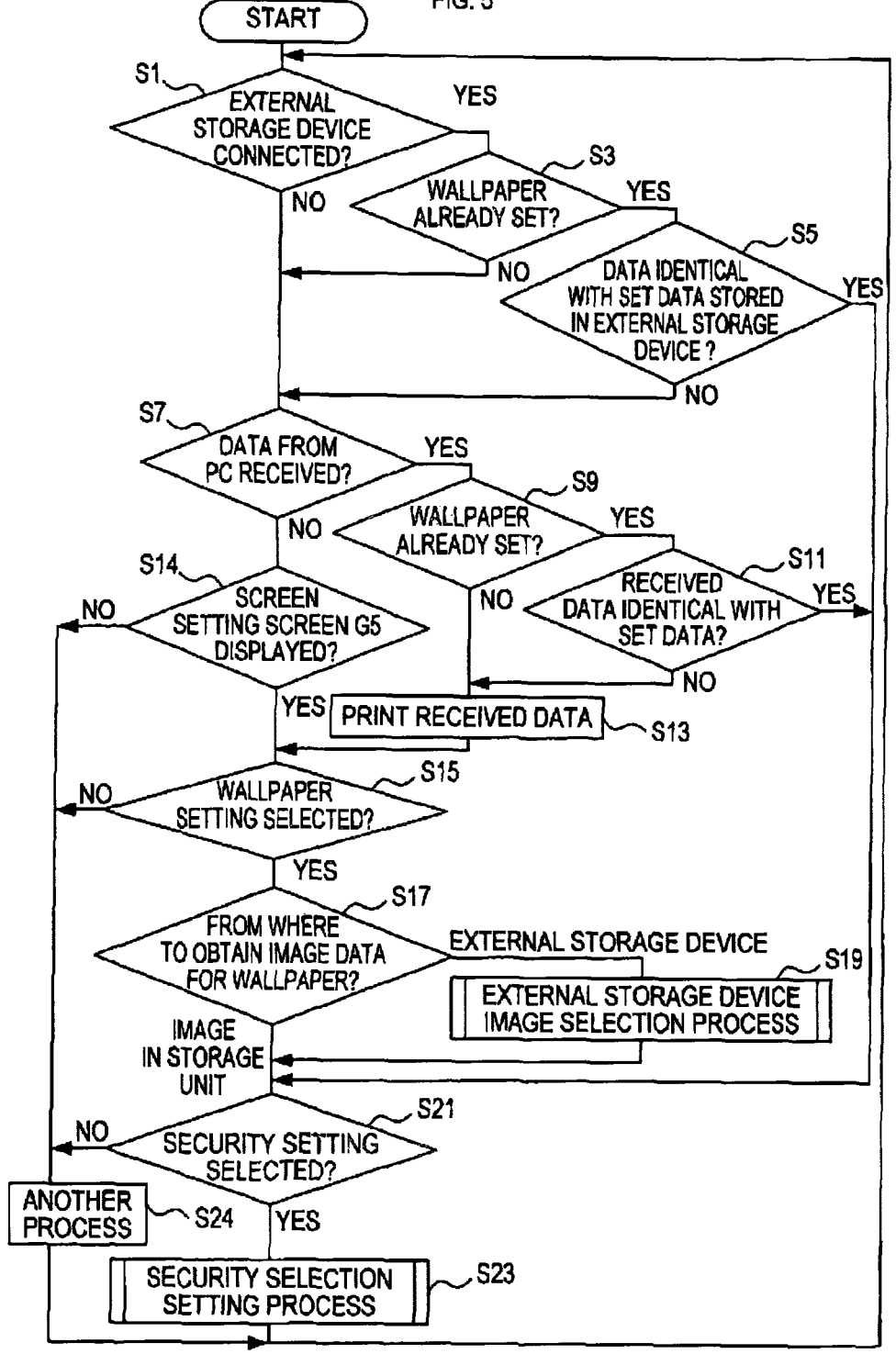
FIG. 5 is a flowchart showing a security setting process.

A main process shown in FIG. 5 is started when a power switch (not shown) of the multifunction device 1 is turned on, and is terminated when the power switch is turned off. The main process is repeatedly executed while the power switch is on.

When the process is started, it is first determined whether or not the external storage device 20 is connected to (inserted into) the connection unit 11 (S1).

When it is determined that the external storage device 20 is connected (S1: YES), it is determined whether or not wallpaper has already been set (S3).

When it is determined that wallpaper has already been set (S3: YES), image data stored in the external storage device 20 is obtained, and it is determined according to the later-described method whether or not image data identical with the image data currently set for the wallpaper (the set data) is stored in the external storage device 20 (S5).

When it is determined that image data identical with the set data is stored in the external storage device 20 is (55: YES), it is determined, based on a user's selection (see the screen G13), whether or not the current set data is to be used as key information to perform security release (S21).

When it is determined that the user has selected not to perform security setting (S21: NO), another process is performed (S24), and S1 is performed again. "Another process" means, for example, a process to be executed (for example, recording medium setting or facsimile) when any option other than "wall setting" in the screen setting screen G5 is selected.

When it is determined that the user has selected to perform security setting (S21: YES), a security selection setting process (described later in detail) is performed (S23), and S1 is performed again.

When it is determined in S1 that the external storage device 20 is not connected (S1: NO), when it is determined in S3 that a wallpaper has not been set (S3: NO), or when it is determined that image data identical with the set data is not stored in the external storage device 20 (S5: NO), it is then determined whether or not data transmitted from the computer is received (S7).

When it is determined that data transmitted from the computer is received (S7: YES), it is then determined whether or not a wallpaper has already been set (S9). When it is determined that a wallpaper has already been set (S9: YES), it is determined whether or not the received data and the set data are identical with each other, according to the same method as in S5 (S11).

When it is determined that the received data and the set data are identical with each other (S11: YES), S21 is performed. When it is determined that the received data and the set data are not identical with each other (S11: NO), or when it is determined in S9 that a wallpaper has not been set (S9: NO), the received data is regarded as not data for security setting but printing data for printing, and the received data received in S7 is printed (S13).

When it is determined in S7 that data is not received (S7: NO), it is then determined whether or not the screen setting screen G5 is displayed on the display panel 7 (S14). When it is determined that the screen setting screen G5 is displayed, that is, when "Screen Setting" is selected in the screen G3 through the screen G1 (S14: YES), or when printing process is finished in S13, it is determined whether or not "Wallpaper Setting" in the screen setting screen G5 is selected by the user (S15).

When it is determined that "Wallpaper Setting" is not selected (S15: NO) or it is determined that the screen setting screen G5 is not displayed (S14: NO), another process is performed (S24), and then S1 is performed again.

On the other hand, when it is determined that "Wallpaper Settin," is selected (S15: YES), it is then determined from where image data for the wallpaper should be obtained based on which of "Wallpaper 1" to "Wallpaper 3" and "Obtain from Medium" in the wallpaper setting screen G7 (S17) is selected by the user.

When it is determined that one of "Wallpaper 1" to "Wallpaper 3" is selected (S17: an image in the storage unit), S21 is performed using the selected image data as the set data.

Identification information allowing identification of the set data is added to the image data (wallpaper) to be used as the set data. When determining whether or not data is identical/nonidentical with the set data in the following process, the set data is referred to on the basis of the identification information.

On the other hand, when it is determined that "Obtain from Medium" is selected (S17: an external storage device), an external storage device image selection process (described later in detail) is executed (S19), and then S21 is performed using the selected image data as the set data.

Although a wallpaper is to be selected by the user in the present embodiment, the multifunction device 1 may be configured to independently specify a wallpaper and use the specified wallpaper as the set data even when any wallpaper is selected by the user.

2.3.2. Wallpaper Image Comparison Process (see FIG. 6)

A wallpaper image comparison process is a process to determine whether or not the set data and received data are identical (S11 in FIG. 5), or whether or not the set data and the data obtained from the external storage device 20 (hereinafter simply referred to as "image data") are identical (S5 in FIG. 5). A description will now be provided taking an example of whether or not the set data and the data obtained from the external storage device 20 (hereinafter simply referred to as the "image data") are identical.

Specifically, as described above, the image data includes at least one of character data and graphic data, and usually also includes additional information, such as a title of the data, date and time of generation or update of the data, and thumbnail image information, in addition to essential data (hereinafter referred to as the "main data") to be used for printing output and display output of the character data and graphic data. That is, each of the image data and the set data is constituted by the main data and the additional information.

The additional information is not limited to a title and date and time of generation or update. For example, in a case where the image data is generated with a digital camera, a manufacturer's name and a model name of the digital camera, and a shooting date and time may be added to the main data as the additional information.

Accordingly, in the present embodiment, the set data and the image data are determined identical when the additional information of the set data and the additional information of the image data are at least partially identical and also the main data of the set data and the main data of the image data are at least partially identical.

Figure 6:
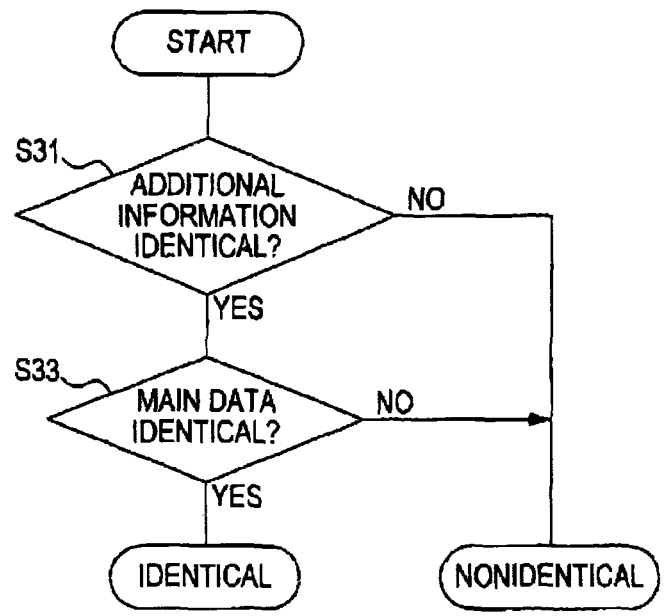
FIG. 6 is a flowchart showing a wallpaper image comparison process.
Figure 7:
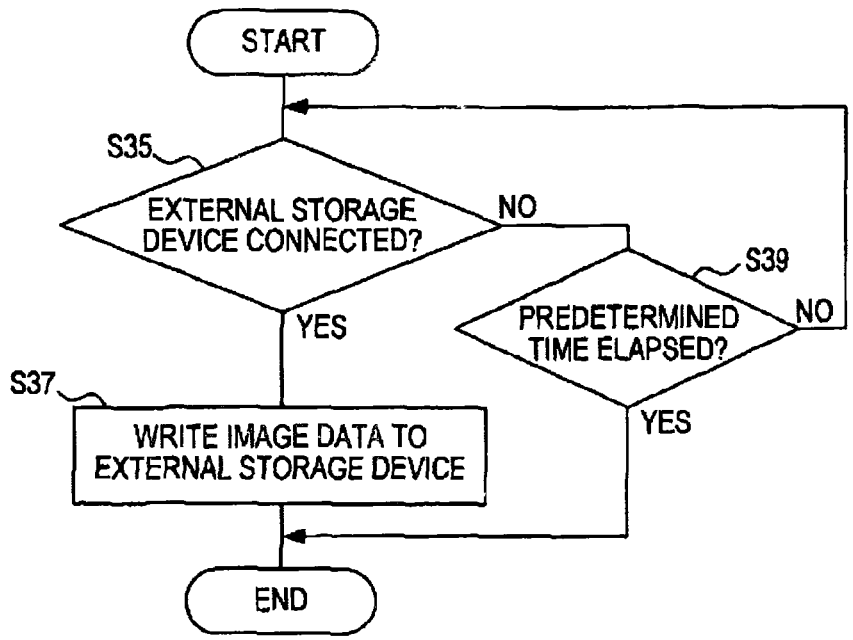
FIG. 7 is a flowchart showing a security selection setting process.

Specifically, in the wallpaper image comparison process, when a process as, for example, shown in FIG. 6 is started, it is first determined whether or not the additional information of the set data and the additional information of the image data are at least partially identical (S31). When it is determined that the additional information is at least partially identical (S31: YES), it is then determined whether or not the main data of the set data and the main data of the image data are at least partially identical (S33).

When it is determined in S33 that the main data are partially identical (S33: YES), the set data and the image data are determined identical. In otherwise cases (S31: NO, S33: NO), the set data and the image data are determined nonidentical.

Although the set data and the image data are determined identical in FIG. 6 when the additional information is at least partially identical and also the main data is at least partially identical, the set data and the image data may be determined identical when the additional information or the main data is at least partially identical.

2.3.3. Security Selection Setting Process (see FIG. 7)

A security selection setting process (S23 in FIG. 5) is a process for writing setting data, i.e., image data set for wallpaper, to be used as key information when security setting is performed into the external storage device 20.

Specifically, when the security selection setting process is started, it is first determined whether or not the external storage device 20 is connected to (inserted into) the connection unit 11 (S35). When it is determined that the external storage device 20 is connected (S35: YES), an attribute to prohibit deletion of data is added to the image data set for the wallpaper (i.e., the set data) and the image data with the attribute is written to the external storage device 20 (S37), and the present process is terminated.

When it is determined that the external storage device 20 is not connected (S35: NO), it is determined whether or not a predetermined time (for example, 60 minutes) has elapsed since the security selection setting process is started (S39). When it is determined that predetermined time has elapsed (S39: NO), S35 is performed again, while when it is determined that predetermined time has elapsed (S39: YES), the present process is terminated.

2.3.4. External Storage Device Image Selection Process (see FIG. 8)

Figure 8:
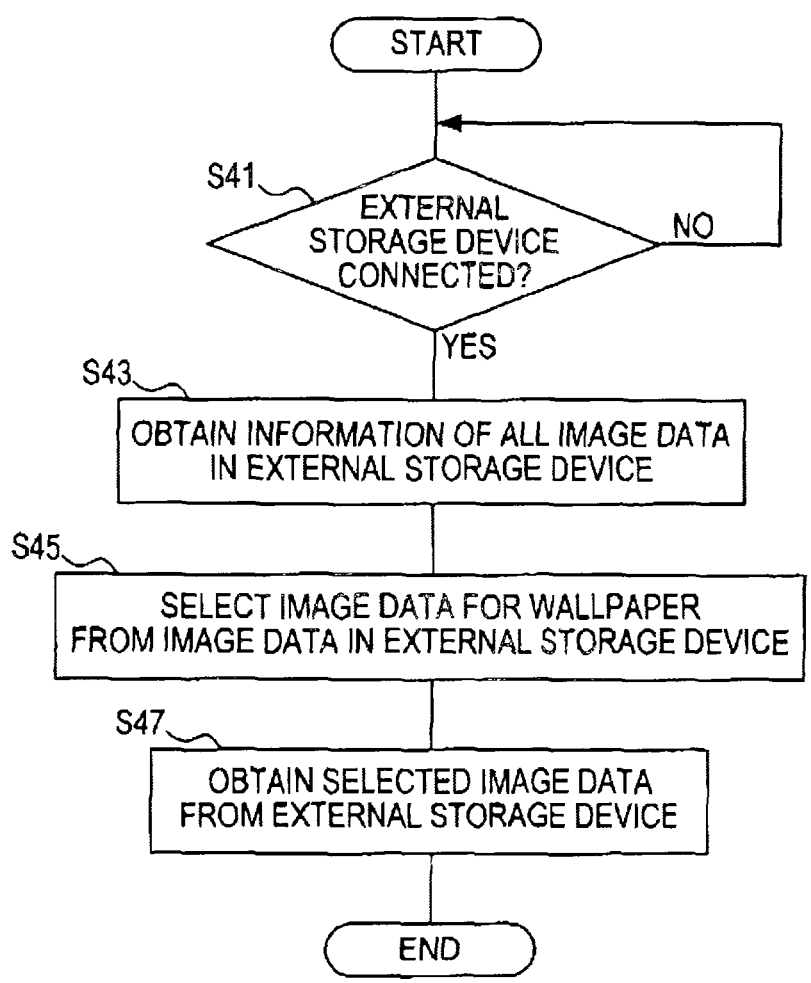
FIG. 8 is a flowchart showing an external storage device image selection process.

As shown in FIG. 8, an external storage device image selection process (S19 in FIG. 5) is a process for allowing selection of the image data to be set for the wallpaper from the external storage device 20 connected to the connection unit 11.

When the external storage device image selection process is started, it is first determined whether or not the external storage device 20 is connected to (inserted into) the connection unit 11 (S41). When it is determined that the external storage device 20 is not connected (S41: NO), the present process remains in a waiting state until the external storage device 20 is connected.

When it is determined that the external storage device 20 is connected (S41: YES), information of all image data stored in the external storage device 20 is obtained, and file names (data names) of the obtained image data and an overview of the image data are displayed on the display panel 7 (S43).

When some image data is selected by the user through the display panel 7, the selected image data is selected as image data for the wallpaper (S46), the selected image data is obtained from the external storage device 20 and stored in the storage unit 9 as the set data (S47). Then, the present process is terminated.

2.4. Security Release

In the present embodiment, security release can be performed by connecting (inserting) the external storage device 20 storing image data identical with the set data stored in the storage unit 9 to (into) the connection unit 11 (hereinafter, this release method is referred to as the "first release method"), or by transmitting image data identical with the set data from a computer or the like (hereinafter, this release method is referred to as the "second release method").

Figure 9:
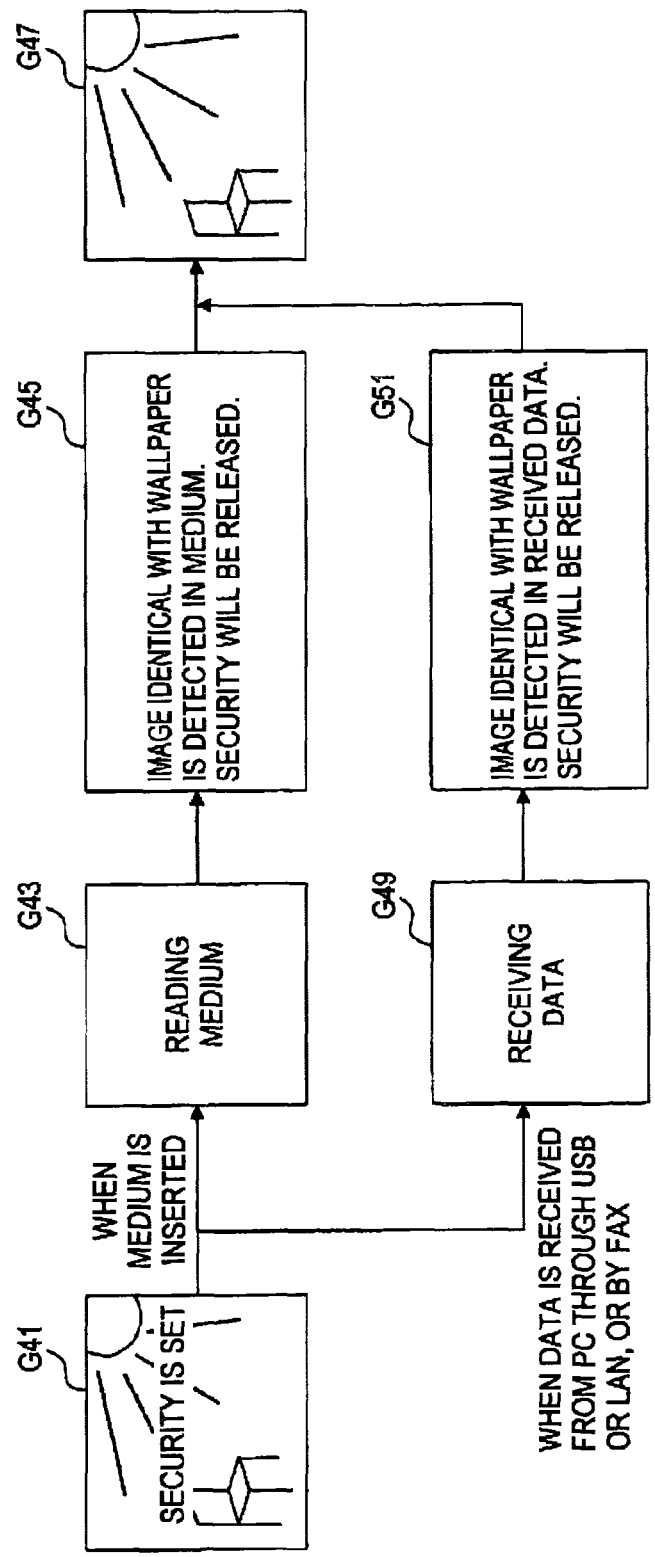
FIG. 9 is a flowchart schematically showing an operation of the multifunction device at the time of security release.

Specifically, FIG. 9 is a flowchart showing guidance screens displayed on the display panel 7 at the time of security release from a security set state according to the progress of the process.

When the external storage device 20 (indicated as "medium" in FIG. 9) is inserted into (connected to) the connection unit 11 while a wallpaper G41 is displayed on the display panel 7 in the security set state, an indication G43 indicating presence of insertion (connection) is displayed on the display panel 7, and it is determined whether or not image data identical with the set data is stored in the external storage device 20.

When it is determined that image data identical with the set data is stored in the external storage device 20, an indication G45 notifying of the determination and notifying that security release will be performed is displayed. Then, security release is performed, and an image G47 set for the wallpaper is again displayed on the display panel 7.

In the security set state, an image G41 indicating security set state is displayed on the display panel 7, while once security release is performed, the image G41 indicating security set state is deleted.

When data transmitted from the computer or facsimile data is received in the security set state with the image G41 indicating security set state displayed on the display panel 7, an indication G49 notifying reception of the data is displayed on the display panel 7, and it is determined whether or not image data identical with the set data is included in the received data.

When it is determined that image data identical with the set data is included in the received data, an indication G51 notifying of the determination and notifying that security release will be performed is displayed. Then, security release is performed, and the image G47 set for the wallpaper is again displayed on the display panel 7.

2.4.1. Details of First Release Method (see FIG. 10)

Figure 10:
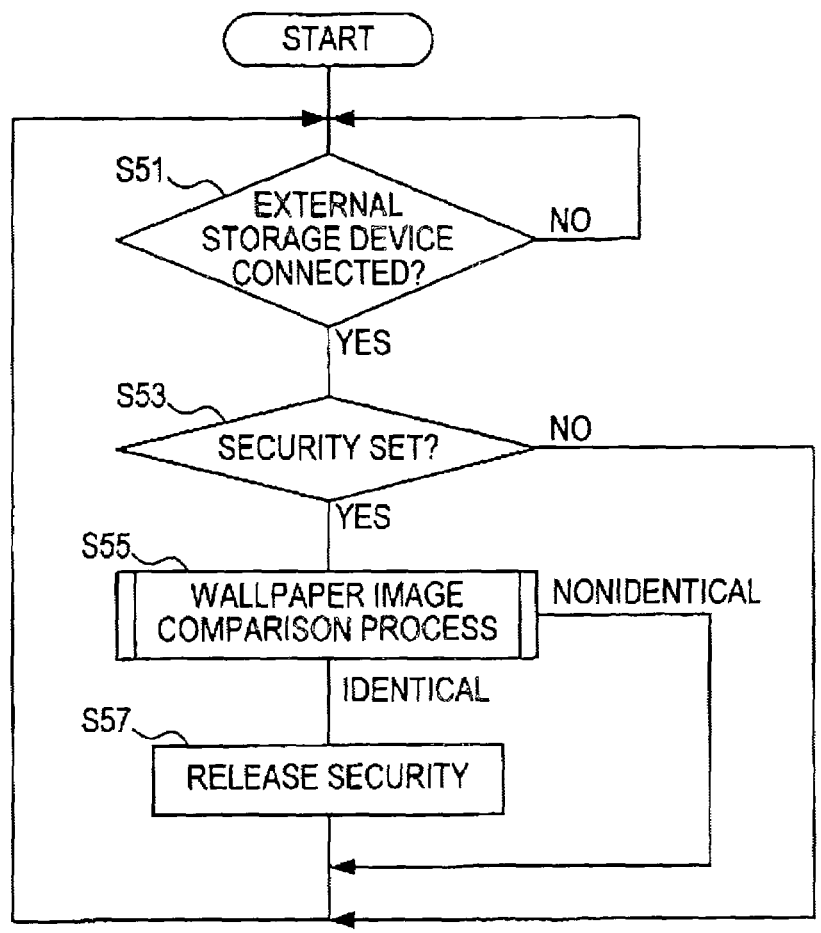
FIG. 10 is a flowchart showing a security release process when an external storage device is connected.

FIG. 10 is a flowchart showing the details of a process of the first release method. This process is started when a power switch (not shown) of the multifunction device 1 is turned on, and is terminated when the power switch is turned off.

When the process in FIG. 10 is started, it is first determined whether or not the external storage device 20 is inserted into (connected to) the connection unit 11 (S51). When it is determined that the external storage device 20 is not inserted (S51: NO), the process enters a waiting state, while when it is determined that the external storage device 20 is inserted (S51: YES), it is then determined whether or not security setting is performed (S53).

When it is determined that security setting is not performed (S53: NO), S51 is performed again, while when it is determined that security setting is performed (S53: YES), the wallpaper image comparison process (see FIG. 6) is performed (S55).

When it is determined that the set data and the image data stored in the external storage device 20 are identical (S55: IDENTICAL), security release is performed (S57), and S51 is performed again. When it is determined that the set data and the image data stored in the external storage device 20 are nonidentical (S55: NONIDENTICAL), security release is not performed and S51 is performed again.

2.4.2. Details of Second Release Method (see FIG. 11)

Figure 11:
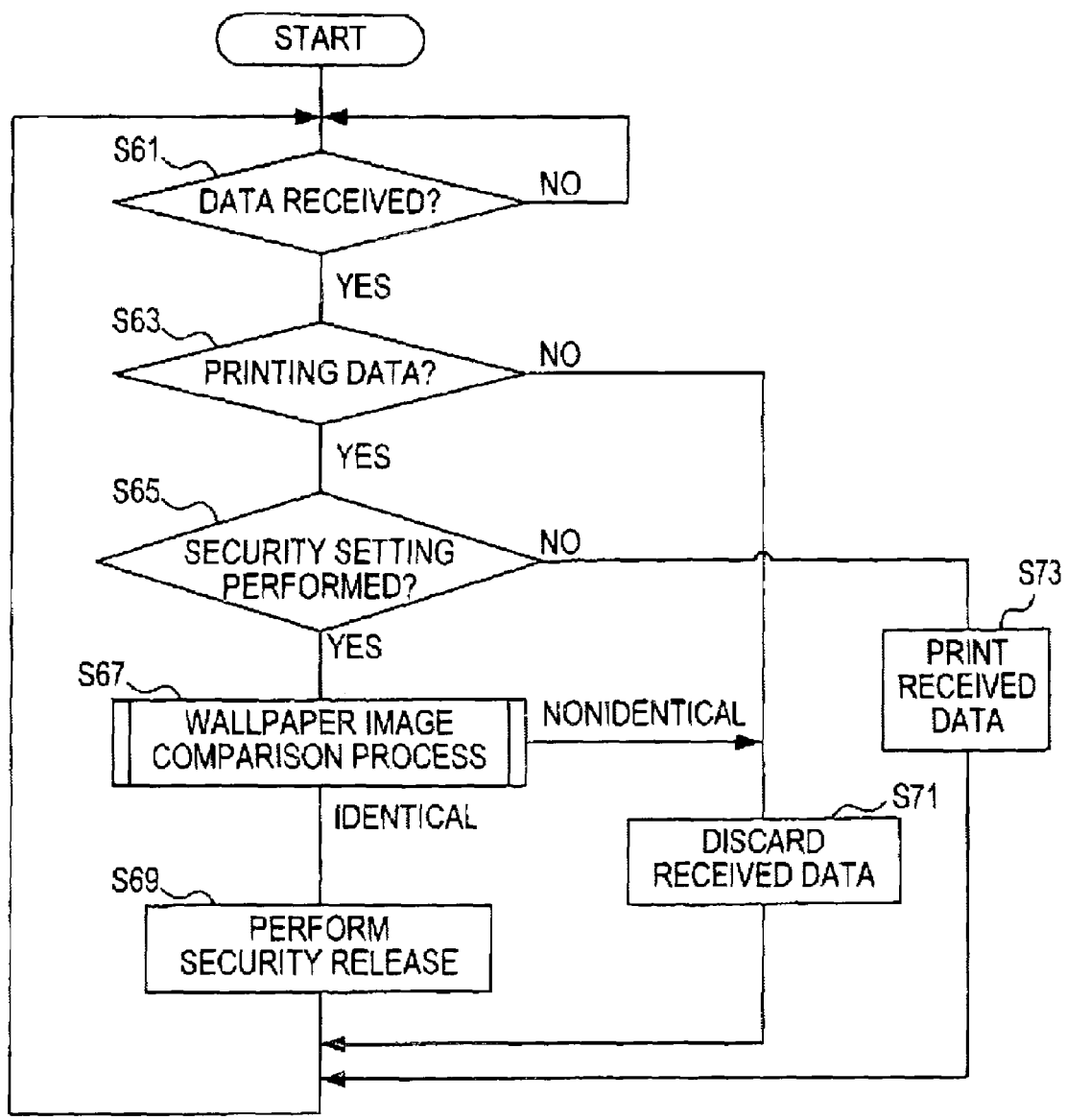
FIG. 11 is a flowchart showing a security release process when data is received from a computer.

FIG. 11 is a flowchart showing the details of a process of the first release method. This process is started when a power switch (not shown) of the multifunction device 1 is turned ton, and is terminated when the power switch is turned off.

When the process in FIG. 11 is started, it is first determined whether or not data transmitted from the computer or the like is received (S61). When it is determined that data is not received (S61: NO), the process enters a waiting state, while when it is determined that data is received (S61: YES), it is then determined whether or not the received data is printing data to be printed (S63).

When it is determined that the received data is not printing data (S63: NO), the received data is discarded (S71), and S61 is performed again, while when it is determined that the received data is printing data (S63: YES), it is then determined whether or not security setting is performed (S65).

When it is determined that security setting is not performed (S65: NO), the received data is printed (S73), and S61 is performed again, while when it is determined that security setting is performed (S65: YES), the wallpaper image comparison process (see FIG. 6) is performed (S67).

When it is determined that the set data and image data included in the received data are identical (S67: IDENTICAL), security release is performed (S69), and S61 is performed again. When it is determined that the set data and the image data included in the received data are nonidentical (S67: NONIDENTICAL), security release is not performed and S61 is performed again.

3. Features of Multifunction Device in the Present Embodiment

In the present embodiment, when it is determined that the image data stored in the external storage device 20 and the image data set for the wallpaper (the set data) are identical (S55: IDENTICAL), an operating state of the device is changed from the prohibited state to the allowed state (S57). Accordingly, the user is not required to input a password and may change the prohibited state to the allowed state easily by connecting the external storage device 20 storing the data identical with the set data to the connection unit 11.

Also, in the present embodiment, an attribute to prohibit deletion of data is added to the set data to generate set data with an attribute, and the generated data is written to the external storage device 20 (S37). This may prevent erroneous deletion of data which is identical with the set data written to the external storage device 20.

Further, in the present embodiment, when it is determined that the received data and the set data are identical with each other (S67: YES), the prohibited state is changed to the allowed state (S69). Accordingly, the user is not required to input a password, and the operating state of the multifunction device 1 may be changed easily from the prohibited state to the allowed state by transmitting data containing data identical with the set data from outside to the multifunction device 1.

In the present embodiment, when the received data is nonidentical with the set data in the prohibited state, the received data is discarded to thereby prohibit execution of processing of the received data (S71). Accordingly, when the received data is nonidentical with the set data in the prohibited state, the prohibited state may be maintained and execution of processing of the received data despite the prohibited state of the multifunction device 1 may be prevented.

In the present embodiment, when it is determined that the image data stored in the external storage device 20 connected to the connection unit 11 is identical with the set data (S5: YES), the operating state of the multifunction device 1 may be changed easily from the allowed state to the prohibited state. Accordingly, the user is not required to input a password and may change the allowed state to the prohibited state easily by connecting the external storage device 20 storing the data identical with the set data to the connection unit 11.

In the present embodiment, when it is determined that the received data and the set data are identical with each other (S11: YES), the allowed state may be changed to the prohibited state. Accordingly, the user is not required to input a password and may change the allowed state to the prohibited state easily by transmitting data containing data identical with the set data from outside to the multifunction device 1.

Also, in the present embodiment, the set data may be easily set in association with the setting of the wallpaper to be displayed on the display panel 7. Accordingly, the user may dispense with a separate operation to specify the set data, and thus the usability of the multifunction device 1 may be improved.

Further, when the set data is constituted by image data including at least data representing graphics as in the present embodiment, the security of the multifunction device 1 may be improved. Specifically, image data including data representing graphics has a larger data size and is more complex than text information such as a password, which makes it difficult to generate replicated data. Accordingly, the security of the multifunction device 1 may be improved by constituting the set data with image data including data representing graphics.

Second Embodiment

In the first embodiment, security release is performed automatically when the external storage device 20 storing image data identical with the set data is connected to the connection unit 11, or when image data identical with the set data is transmitted from the computer or the like to the multifunction device 1. In contrast, in a second embodiment, security release is notified to request confirmation by the user before security release is actually performed.

Specifically, FIG. 12 is a flowchart showing guidance screens displayed on the display panel 7 at the time of security release according to the progress of the process.

When the external storage device 20 (indicated as "medium" in FIG. 12) is inserted into (connected to) the connection unit 11 while a wallpaper G53 is set and displayed on the display panel 7 in the security set state, an indication G55 indicating presence of insertion (connection) is displayed on the display panel 7, and it is determined whether or not image data identical with the set data is stored in the external storage device 20.

When it is determined that image data identical with the set data is stored in the external storage device 20, a confirmation message G57 notifying of the determination and confirming whether or not to actually perform security release is displayed. When the user gives instructions to perform security release, security release is actually performed, and an image G59 set for the wallpaper is again displayed on the display panel 7.

In contrast, when the user gives instructions not to perform security release, security release is not performed, and an image G61 showing the image set for the wallpaper and indicating the security set state is displayed on the display panel 7.

When data transmitted from the computer or facsimile data is received in the security set state with the wallpaper G53 set and displayed on the display panel 7, an indication G63 notifying reception of the data is displayed on the display panel 7, and it is determined whether or not image data identical with the set data is included in the received data.

When it is determined that image data identical with the set data is included in the received data, a confirmation message G65 notifying of the determination and confirming whether or not to actually perform security release is displayed. When the user gives instructions to perform security release, security release is actually performed, and an image G59 set for the wallpaper is again displayed on the display panel 7.

In contrast, when the user gives instructions not to perform security release, security release is not performed, an image G61 showing the image set for the wallpaper and indicating the security set state is displayed on the display panel 7.

Other Embodiments

While the information processing apparatus of the present invention is applied to a multifunction device in the above-described embodiments, the present invention should not be limited to these embodiments but may be applied to other devices.

Also, while the present invention is described by way of example of data constituted by main data and additional information as image data, the image data in the present invention should not be limited to such data. For example, information indicating key information to perform security release may be added to the image data to be written to the external storage device 20.

Further, while the processes in FIG. 5, FIG. 10 and FIG. 11 are illustrated in the form of separate flowcharts in order to simplify the description of the embodiments, the processes, all of which are started when the power switch (not shown) of the multifunction device 1 is turned on and terminated when the power switch is turned off, may be configured as one integrated process.

Moreover, the present invention should not be limited to the above embodiments, and various modifications may be made in accordance with the gist of the invention as described in the claims.

For example, in the description of the above embodiment, a function of displaying a background image on the display unit is taken as an example of the processing function provided to the multifunction device, and the data to be used to perform the processing function is the data for the wallpaper. However, it may be possible to use a function of displaying a screensaver (a moving image) used on a display screen of a PC or the like as the processing function, and perform changing control of an operating state of the device of the present embedment using data of the screensaver as data to be used for performing the processing function. In a case where a telephone function is provided, changing control of an operating state of the device may also be performed based on data set as a ringtone (a ringing tone).

Although the programs for executing the processes shown in FIG. 5 through FIG. 8 are stored in the ROM of the multifunction device 1 in the above-described embodiments, a storage medium for storing the programs is not limited to a ROM. For example, the programs may be stored in a storage medium installed in the multifunction device 1, such as an EPROM, or in a removable storage medium, such as a floppy disk or a compact disk. Alternatively, the programs may be downloaded from a website.

What is claimed is:

1. An information processing apparatus comprising:
a processing function that is configured to process information;
a data providing device that is configured to provide first image data to the information processing apparatus;
a specifying device that is configured to specify at least one wallpaper image;
a storage device that is configured to store image data for the at least one wallpaper image specified by the specifying device as second image data;
a setting device that is configured to selectively set:
a security set state in which operation of the processing function in not allowed, and
a security release state in which operation of the processing function is allowed;
a determination device that is configured to determine whether the first image data matches the second image data;
a changing device that is configured to instruct the setting device, when it is determined by the determination device that the first image data matches the second image data, to change one of security set state and the security release state which is previously set to the other state;
an inquiry device configured to inquire whether to perform security setting using the at least one wallpaper image specified by the specifying device; and
a control device that is configured to:
allow operation of the changing device in accordance with instructions to perform security setting in response to the inquiry by the inquiry device, and
display the at least one wallpaper image specified by the specifying device on the display unit as a waiting state screen in accordance with instructions not to perform security setting in response to the inquiry by the inquiry device.

2. The information processing apparatus as set forth in claim 1, wherein the data providing device comprises:
a connection device that is configured to detachably connect to a recording medium; and
a reading device that is configured to read data stored in the recording medium when the recording medium is connected to the connection device, wherein the providing device is configured to provide the data read from the recording medium to the information processing apparatus.

3. The information processing apparatus as set forth in claim 2, further comprising:
an attribute adding device that is configured to an attribute to the first image data that prevents deletion of the first image data; and
a writing device that is configured to write the first image data with the attribute to the recording medium when the recording medium is connected to the connection device.

4. The information processing apparatus as set forth in claim 1, wherein:
the data providing device comprises a receiving device that is configured to receive data transmitted from outside of the information processing apparatus, and
the data that is received by the receiving device includes the first image data.

5. The information processing apparatus as set forth in claim 4, further comprising:
a prohibiting device that is configured not to allow, in the security set state, execution of processing of the data received by the receiving device when the first image data included in that received data does not match the second image data.

6. The information processing apparatus as set forth in claim 1, further comprising a display control device that is configured to control displaying of the wallpaper image on a display device, wherein the display device is configured to display a variety of information.

7. The information processing apparatus as set forth in claim 1, wherein the specifying device is configured to specify the wallpaper image from images stored in a recording medium connected to the information processing apparatus.

8. The information processing apparatus as set forth in claim 6, wherein the specifying device is configured to specify the wallpaper image from images stored in the storage device.

9. The information processing apparatus as set forth in claim 2, wherein the second image data at least includes data representing graphics.

10. The information processing apparatus as set forth in claim 9, wherein the determination device determines whether the first image data matches the second image data based on a comparison between image data representing graphics in the first image data and image data representing graphics in the second image data.

11. The information processing apparatus as set forth in claim 4, wherein the second image data at least includes data representing graphics.

12. The information processing apparatus as set forth in claim 11, wherein the determination device determines whether the first image data matches the second image data based on a comparison between image data representing graphics in the first image data and image data representing graphics in the second image data.

13. A non-transitory computer-readable medium comprising a program stored therein,
the program being installed on and operated by an information processing apparatus that comprises a processing function that is configured to process information, a connection device that is configured to detachably connect to a recording medium that stores first image data, and a storage device that that is configured to store second image data,
wherein the program is configured to cause the information processing apparatus to function as:
a reading device that that is configured to read the first image data stored in the recording medium when the recording medium is connected to the connection device;
a specifying device that is configured to specify at least one wallpaper image, the wallpaper image specified by the specifying device as second image data being stored in the storage device as the second image data;
a setting device that is configured to selectively set:
a security set state in which operation of the processing function is not allowed, and
a security release state in which operation of the processing function is allowed;
a determination device that is configured to determine whether the first image data matches the second image data;
a changing device that is configured to instruct the setting device, when it is determined by the determination device that the first image data matches the second data, to change one of the security set state and the security release state which is previously set to the other state;
an inquiry device configured to inquire whether to perform security setting using the at least one wallpaper image specified by the specifying device; and
a control device that is configured to:
allow operation of the changing device in accordance with instructions to perform security setting in response to the inquiry by the inquiry device, and
display the at least one wallpaper image specified by the specifying device on the display unit as a waiting state screen in accordance with instructions not to perform security setting in response to the inquiry by the inquiry device.

14. A non-transitory computer-readable medium comprising a program stored therein,
the program being installed on and operate by an information processing apparatus that comprises a processing function that is configured to process information, a receiving device that is configured to receive first image data transmitted from outside of the information processing apparatus, and a storage device that is configured to store second image data,
wherein the program is configured to cause the information processing apparatus to function as:
a specifying device that is configured to specify at least one wallpaper image, the wallpaper image specified by the specifying device as second image data being stored in the storage device as the second image data;
a setting device that is configured to selectively set:
a security set state in which operation of the processing function is not allowed, and
a security release state in which operation of the processing function is allowed;
a determination device that is configured to determine whether the first image data matches the second image data;
a changing device that is configured to instruct the setting device, when it is determined by the determination device that the first image data matches the second image data, to change one of the security set state and the security release state which is previously set to the other state;
an inquiry device configured to inquire whether to perform security setting using the at least one wallpaper image specified by the specifying device; and a control device that is configured to:
> allow operation of the changing device in accordance with instructions to perform security setting in response to the inquiry by the inquiry device, and
>
> display the at least one wallpaper image specified by the specifying device on the display unit as a waiting state screen in accordance with instructions not to perform security setting in response to the inquiry by the inquiry device.

* * * * *